United States Patent [19]

Meshberg

[11] 4,061,247

[45] Dec. 6, 1977

[54] METHOD OF AND APPARATUS FOR CONTROLLING OF TRAVEL OF THE PLUNGER IN A DISPENSING PUMP CHAMBER

[76] Inventor: Philip Meshberg, 85 Old Oaks Road, Fairfield, Conn. 06430

[21] Appl. No.: 633,798

[22] Filed: Nov. 20, 1975

Related U.S. Application Data

[63] Continuation-in-part of Ser. No. 339,129, March 8, 1973, abandoned.

[51] Int. Cl.² .................................................. G01F 11/38

[52] U.S. Cl. ........................................ 222/1; 222/321; 222/341; 222/385

[58] Field of Search .................. 222/321, 336, 340, 1, 222/341, 385, 509

[56] References Cited

U.S. PATENT DOCUMENTS 3,211,346 10/1965 Meshberg ........................ 222/309 X

*Primary Examiner*—Robert B. Reeves
*Assistant Examiner*—John P. Shannon
*Attorney, Agent, or Firm*—Kenyon & Kenyon, Reilly, Carr & Chapin

[57] ABSTRACT

Various means for controlling the rate of travel of a plunger through a pump chamber in a dispensing pump are disclosed including an arrangement in which a cap is slidably mounted to the upper end of the pump plunger and a spring interposed between the cap and plunger with a detent mounted on the container contacting the plunger to prevent downward motion so that as the cap is depressed it is moved downwardly relative to the plunger preloading the spring and in which, after a predetermined degree of motion of the cap relative to the plunger, the lower end of the cap releases the detent to that the preload expands driving the plunger downwardly at a uniform rate. In another illustrated embodiment a preload spring is disposed within the pump between a plunger stem and plunger piston, the hydraulic forces within the pump chamber permitting the spring to be compressed before an outlet passage is opened, the spring once again acting to permit uniform discharge. In another embodiment, detents inside the pump cause an operator to build up a certain amount of finger pressure to overcome the detents whereby, the pressure having been built up in the finger, the operator will smoothly and quickly discharge material.

6 Claims, 32 Drawing Figures

Fig.13.
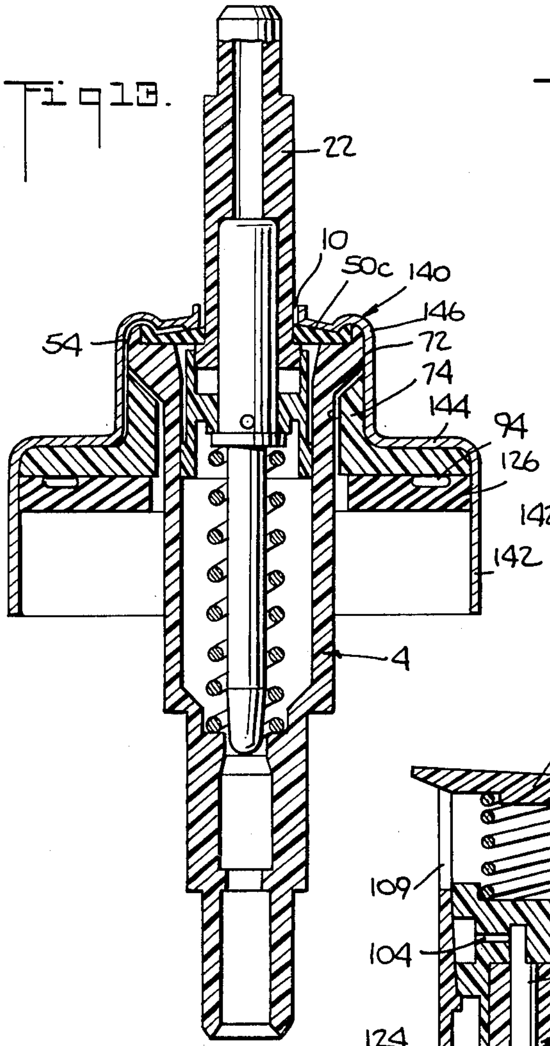
Fig.15.
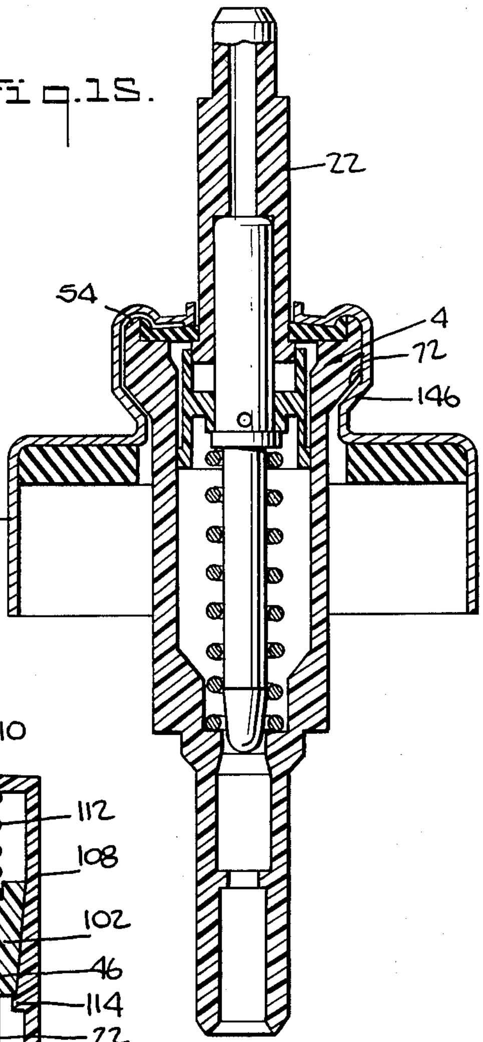
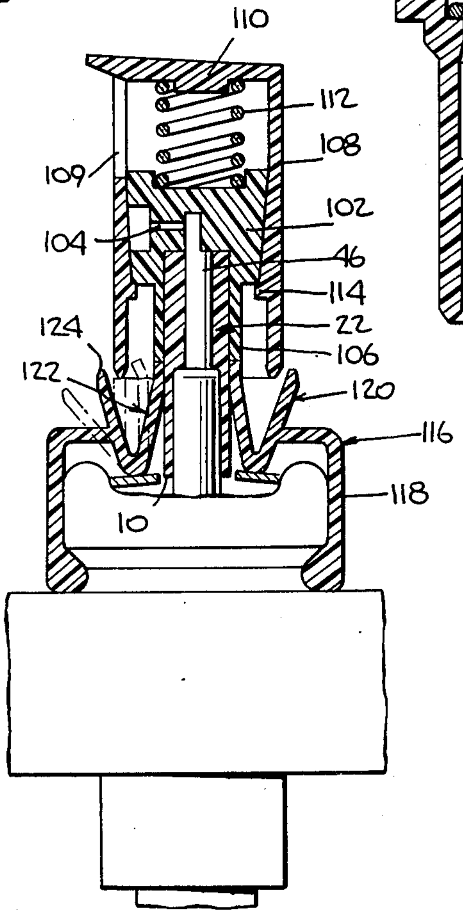
Fig.17.

METHOD OF AND APPARATUS FOR CONTROLLING OF TRAVEL OF THE PLUNGER IN A DISPENSING PUMP CHAMBER

RELATED APPLICATIONS

This application is a continuation-in-part of application Ser. No. 339,129 filed Mar. 8, 1973, now abandoned, including claims which were deleted from that application based on a restriction requirement made by the examiner.

BACKGROUND OF THE INVENTION

This invention relates to a dispensing unit for liquid, of the type comprising a liquid filled container in which is mounted a finger operated pump having a plunger which ejects a spray of liquid when it is depressed.

In packaging liquids which are to be dispensed by being sprayed in measured amounts, it is common to utilize a liquid filler container provided with a pump having a plunger or stem which releases a jet of liquid when the plunger or stem is depressed. Liquids packaged in such a manner may, for example, include various types of household cleaning liquids, perfumes, oral sprays and the like.

On type of prior dispensing unit includes a pump body extending vertically within a liquid filled, sealed container having a low pressure gas therein for supplying material from the container to the pump. A plunger passes through a chamber in the pump body. The lower end of the plunger or stem controls a valve at the lower end of the chamber. When the plunger or stem is in a raised position relative to the pump body the valve places the chamber in communication with the interior of the container. A piston in the chamber prevents fluid communication between an outlet passage in the upper part of the stem and the chamber beneath the piston when the stem is in the raised position. An initial downward movement of the stem causes closing of the valve at the lower end of the chamber and then moves the outlet passage downwardly of the piston into fluid communication with the chamber below the piston. Continued downward motion moves the piston downwardly expelling the liquid in the upper chamber via the outlet passage. On subsequent return motion of the plunger or stem, the piston travels upwardly creating a region of suction in the chamber until the plunger is elevated sufficiently to open the valve at the lower end of the chamber so that liquid flows in from the interior of the container under the force of the low pressure gas. Such a pump is disclosed, for example, in applicant's prior U.S. Pat. No. 3,211,346. A pump which works similarly, except that during the up stroke, the valve at the lower end of the chamber is opened simultaneously with the opening of the outlet passage, is disclosed in Corsette U.S. Pat. No. 3,237,571. See also, Gorman, U.S. Pat. No. 3,187,960.

Additional venting structure may be provided in a pump of this general type to admit air to the interior of the container to replace the liquid expelled so that a partial vacuum is not developed within the container which would prevent flow of liquid into the chamber. Pumps having a general venting structure are disclosed, for example, in O'Donnell et al. U.S. Pat. No. 3,159,316; Fedit U.S. Pat. No. 3,331,559 and Boris U.S. Pat. Nos. 3,239,151 and 3,627,206. See also, Brown U.S. Pat. No. 3,194,447 and Wise et al. U.S. Pat. No. 3,237,849. In addition, see, for example, Fedit U.S. Pat. Nos. 3,161,329 and 3,387,789. See also U.S. Pat. No. 3,761,022 to Kondo.

In a different type of unit, a refillable aerosol valve rather than a finger operated pump of the present invention, it has been known to utilize a construction as shown in O'Donnell U.S. Pat. No. 3,473,704.

In each of these prior art patents (other than my U.S. Pat. No. 3,211,346) the valve at the lower end of the chamber is always opened as soon as the piston begins to move upward. That is to say, in general, check valves are used, most typically a ball check valve. Although this type of valve works well, it does have some problems in that they are subject to improper seating if the dispenser is not held properly and add to the cost of manufacture of the valve.

In dispensing units using pumps, there are a number of basic requirements. Because these pumps are usually thrown away after use, the cost of the pump must be kept as low as possible. Ideally, if the pump parts can all be made of molded plastic in such a way that they are easily assembled, this requirement will be met. Furthermore, particularly when being used for dispensing liquid such as perfumes, which are highly volatile, a good seal sealing of the venting passages is needed. Finally, the pump must operate reliably to dispense the measured amount of the liquid with each stroke. None of the prior art devices meet all these requirements. Thus, it becomes evident that there is a need for an improved pump which will provide all the above noted features.

SUMMARY OF THE INVENTION

The pump of the present invention is designed to be used with a container at least partially filled with liquid. Portions of the container, such as the mounting cup, engage the upper end of a pump body which extends vertically within the container and has a chamber at its upper end. A plunger or stem extends downwardly into the pump body and has a lower end constituting a valve member which cooperates with a valve seat at the lower end of the chamber. The interior of the pump body below the valve seat communicates with the interior of the container below the level of the liquid. The plunger or stem, which is movable vertically between raised and depressed positions relative to the pump body, includes an outlet passage. A piston extends sealingly across the upper chamber and is mounted for restricted axial sliding motion on the stem. When the stem is in the raised position, a piston slide valve prevents fluid communication between the outlet passage and the chamber beneath the piston. An initial downward movement of the stem closes flow through the valve seat and then moves the lower end of the outlet passage downwardly of the piston into fluid communication with the chamber below the piston. Continued downward motion of the stem or plunger thereafter carries the piston downwardly within the chamber expelling the liquid within it via the outlet passage. After the stem or plunger has been moved to its extreme, depressed position it is released and a compression spring causes an initial upward motion of the stem which moves the lower end of the outlet passage upwardly of the piston to seal the upper passage from communication with the chamber. Continued upward motion of the plunger by the spring carries the piston upwardly creating a vacuum within the chamber. As the plunger approaches its raised position, the inlet valve opens and air pressure enters the container and forces the liquid into the evacuated chamber priming it for the next downward depression of the stem or plunger.

In the preferred embodiment all pump parts except the spring are made of molded plastic.

In contrast to the previous use of this type of pump with a container charged with a low pressure gas, the present invention employs such a pump in a vented configuration. Of particular interest is the fact that although the inlet valve does not open until the plunger approaches its fully raised position, proper filling of the chamber still takes place under the differential pressure created. Furthermore, this is accomplished without the use of rubber sealing means as was done in the prior art, i.e., all parts were made of plastic. In this manner, the advantage of a positive plastic to plastic seal at the bottom of the chamber rather than relying on a check valve such as a ball check valve is provided to insure reliable dispensing of the material with each pump stroke. Furthermore, the elimination of the need for separate check valve piece such as a ball reduces the cost of the valve both with regard to material cost and assembly time. Thus, through the use of such a pump made of plastic parts, two of the above noted requirements, that of low cost and reliable operation are obtained.

The final requirement for good sealing, particularly where the pump is to be used with perfume or the like, while still obtaining adequate venting of air to the container constitutes another feature of the present invention. A number of structures for admitting air to the interior of the container to replace liquid ejected during operation which structure is leak-proof when the device is not in use, i.e., with the stem or plunger in the up [fully extended ] position are shown. In general an annular sealing disc of resilient material, having upper and lower faces is mounted between the upper end of the pump body and portions of the container such as the mounting cup which overlie the disc. The sealing disc extends radially inwards to encircle the stem or plunger. The overlying portions of the container have an inner peripheral edge closely spaced from the interior of the container at least partially across one of the faces of the sealing disc. The stem or plunger is provided with a portion such as an annular flange which, when the plunger is in the raised position, abuts the lower surface of the sealing disc and presses the latter's upper surface against the overlying portion of the container. The sealing disc prevents any flow of air between the gap and the passage or any leakage of contents until the flange on the plunger is moved downwardly out of contact with the sealing disc. In an alternate embodiment the sealing disc is eliminated and the mounting cup is made of plastic such that cooperating surface portions of the plunger and mounting cup effect the seal when the plunger is raised and allow the container to vent when the plunger is lowered.

In order to assure that the vent passage is not blocked during assembly of the parts by crimping the pump to the overlying container portions, in one embodiment, the pump body is provided with a plurality of rounded knurls spaced circumferentially around its exterior surface at the point where the pump body is crimped to the container. For containers which use screw caps, the pump may be mounted in combination with a flange adaptor similarly optionally provided with rounded knurls on one or more interior surfaces to cooperate with the adjacent pump body surfaces to further guarantee full and easy venting of the container during pump operation. When the mounting cup is made of plastic it is adapted with beads for mounting to the container by simply snapping on over the neck of the container.

A number of alternate embodiments of the basic structure are illustrated. A particularly advantageous manner of obtaining the necessary venting channels to permit air to enter the container comprises a recess in the enlarged upper end of the pump body surrounded by an annular rim into which the sealing disc is inserted between the pump body and the mounting cup has a plurality of notches formed in its side extending from the bottom of the enlarged portions to the level at said annular rim where the sealing discs rests. The notches are of a depth so as to intersect the bottom portion on which the sealing discs rests to form a plurality of holes therein. In a slightly modified embodiment channels are continued from the holes in the base of the top of the pump body to underlie the gasket or sealing disc and form more positive channels. In this case, as in other embodiments, air from the outside is admitted in a gap between the sealing disc and the upper portion of the plunger. This gap may be obtained through a tapering of the stem or alternatively by the formation of grooves on the stem.

The plunger or stem is made in two parts, the lower part containing the slidably mounted piston and acting to seal off the bottom of the chamber. The upper part of the stem is pushed thereover and is the portion which is inserted through the sealing disc and mounting cup. In one embodiment, the lower portion of the stem contains a central passageway communicating with the central passageway in the upper portion of the stem from the top of which the material is discharged. The piston slide valve referred to above in this case comprises a valve orifice which is opened and closed by coming in and out of contact with an internal portion of the piston. In an alternate embodiment, the internal passageway in the lower stem portion is replaced by one or more grooves the bottoms of which are opened and closed by the piston slide valve. The tops of the channels communicate with the central internal passage of the top portion of the stem. In some materials such as hair spray, clogging of a single internal channel and the orifice through the side wall communicating therewith can occur. This is less likely with channels and particularly, where a plurality of channels are used, continued operation is possible even should one channel become clogged. Particularly in this embodiment the top portion of the stem is provided with an annular seal which, when the pump is operated, will abut against the piston to prevent leakage of material around the upper stem portion and out through the gap between the stem and the mounting cup.

Also disclosed is a pump body of much larger dimensions and which does not extend all the way to the top of the mounting cup through which the stem projects, but is instead snapped into the larger dimension of the mounting cup therebelow.

In addition, a design of the tank which permits snapping into the mounting cup in a manner which prevents it from being dislodged even when great pressure must be exerted on the pump to overcome a clogging problem is shown.

A further aspect of the present invention resides in means for controlling the rate of travel of the plunger through the chamber, thereby contributing to the uniformity of the amount of liquid that is dispensed on each operation of the device. Two basic types of devices are shown. The first operates by causing the user to build up a finger pressure to overcome a detent or the like. Once the detent is overcome, this finger pressure which has been built up results in an even travel of the piston in the pump to give a uniform spray. In one embodiment this is accomplished by forming a detent at the bottom inlet to the pump chamber which must be overridden by the plunger or stem. Another embodiment operating on the same principle includes a cap slidably mounted on the upper end of the plunger and a spring interposed between the cap and the plunger. A detent mounted on the container contacts the plunger to prevent the downward motion so that as the cap is depressed it moves downwardly relatively to the plunger preloading the spring. After a predetermined degree of motion of the cap relative to the plunger, the lower end of the cap releases the detent so that the preloaded spring expands driving the plunger downwardly at a uniform rate. In this way, the rate at which the plunger is driven into the pump body is maintained at a generally constant level so that uniformity of spray and atomization is achieved and approximately the same amount of liquid is expelled upon each use of the dispensing unit.

In another illustrated arrangement, a further spring is interposed between the piston and the top portion of the stem. Initial movement of the plunger precompresses this spring which then aids in maintaining a uniform rate of dispensing as the plunger is moved the rest of the way down.

BRIEF DESCRIPTION OF THE DRAWINGS

A dispensing unit constructed in accordance with a preferred embodiment of the invention, is illustrated in the accompanied drawings in which:

FIG. 13 is a cross-sectional side view on an enlarged scale of a fourth embodiment of the invention including a modified mounting cup and flange adaptor;

FIG. 15 is a cross-sectional side view on an enlarged scale of a fifth embodiment of the invention showing a mounting cup being crimped to the pump body of FIG. 8 without a flange adaptor;

FIG. 17 is a cross-sectional side view of a portion of the pump assembly shown in FIG. 1 with additonal structure mounted thereon for causing downward motion of the plunger at a uniform rate on each depression.

DETAILED DESCRIPTION

Figure 1:
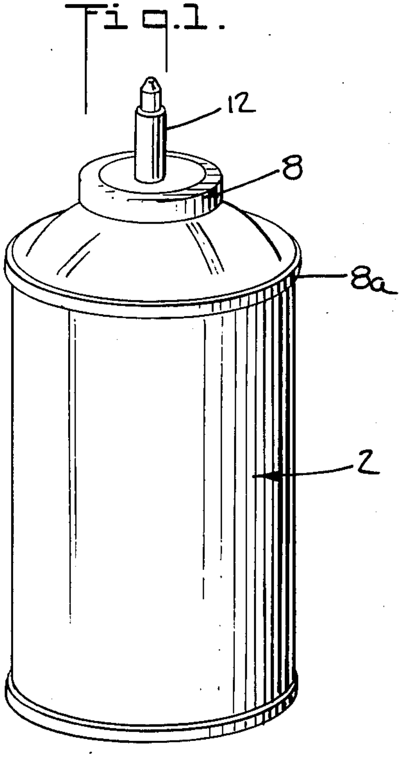
FIG. 1 is a perspective view of a dispensing unit constructed in accordance with the preferred embodiment of the invention.

Referring to FIG. 1 of the drawings, a dispensing unit constructed in accordance with one embodiment of the invention is there shown.

The dispensing unit includes a container 2 to which is fixedly secured a pump assembly including a mounting cup as hereinafter described. The container 2, in the form of a conventional metal can body, is partially filled with the liquid to be dispensed and has an internal air space above the liquid. Mounted on the mounting cup and extending within the container is a hollow tubular pump body 4 (FIG. 2), having a bulbously enlarged, upper end region 6. Adjacent engaging portions, designated generally as 8, of the upper end wall of the container 2, being the mounting cup portion of the container, are crimped about the upper end 6 of the pump body forming an airtight seal between the pump body and the container. The mounting cup 8 is itself crimped or rolled or otherwise secured to the container, as at 8*a* in FIG. 1, in an airtight seal. A central opening 10 extending through the engaging portions 8 of the mounting cup loosely encircles the upper end of a plunger 12 extending into the pump body. The pump body 4 also includes aligned cylindrical, upper and lower chambers 14 and 16 separated by a transverse wall having a throat 18, of smaller diameter than either chamber. The throat 18 is the inlet opening to the upper chamber 14. The lower chamber 16 communicates with the liquid in the container through a dip tube 20 extending downwardly into the liquid. The upper chamber 14 is also called the pump chamber or central housing.

The previously mentioned stem or plunger 12 comprises rod-like upper and lower bodies 22 and 24 respectively with the lower body being force-fitted or adhesively secured into a bore 26 at the lower end of the upper stem portion. The lower plunger body 24 has upper and lower portions of relatively greater and lesser diameter and its lower end is slidingly and sealingly received in the previously mentioned throat 18 between the chambers of the pump body.

Liquid can pass from the lower chamber 16 to the upper or pump chamber 14 when the plunger 12 is in a raised position shown in FIG. 1 through a lower passage 28 at the lower end of the lower body 24 of the plunger extending through the throat. The lower end of the plunger and the throat function as a valve member and a valve seat, respectively, as will be described. The lower passage 28, for example, constitutes two diametrically opposed grooves extending axially along the exterior of the lower end of the plunger. However, it may alternatively be configured as a slot through the lower end of the lower plunger body or as a central bore communicating at its upper end through a radial connecting port with the interior of the upper chamber. It may also be tapered (see FIG. 7).

Figure 2:
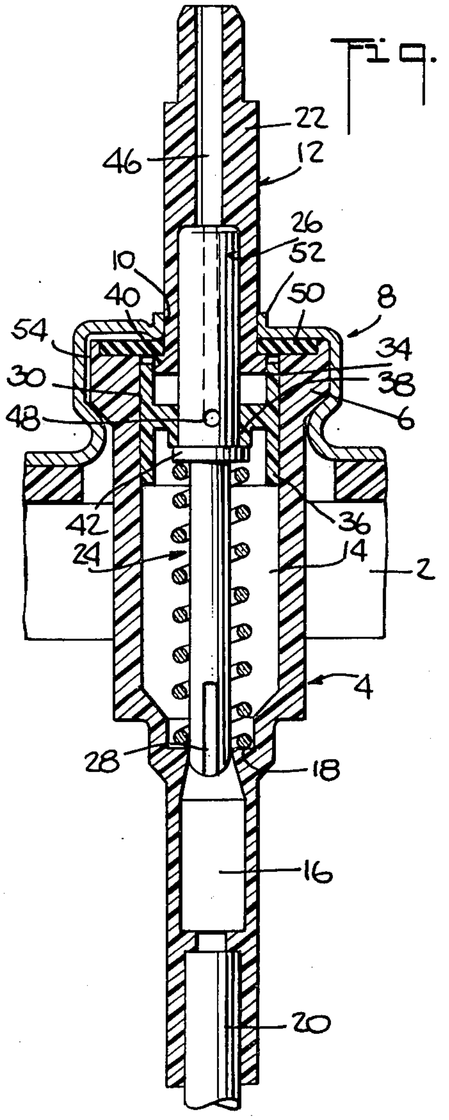
FIG. 2 is a cross-sectional side view of a pump assembly including a pump body and plunger constructed in accordance with a preferred embodiment of the invention, with the plunger shown in a fully raised position thereof.

The liquid admitted to the pump chamber 14 is expelled by a piston 30 mounted for sliding motion within the pump chamber. The piston assembly 30 includes a central, annular piston body 32 extending radially between the upper, enlarged diameter portion of the plunger lower body 24 and the adjacent interior wall surface of the upper chamber 14, in sliding, sealing relation with both. Extending above and below the piston body 32 along its peripheral edge are upper and lower annular flanges 34 and 36, respectively. An annular, inner lip 38 extends about the inner peripheral edge of the piston body and extends downwardly for a shorter axial distance than the lower flange 36. The piston 30 is slidable on the upper part of the plunger lower body 24 between upper and lower limit members constituted by flanges 40 and 42 respectively. The flange 40 extends about the lower end of the plunger upper body 22 and the flange 42 extends about the lower end of the enlarged upper part of the plunger lower body 24. In a normal condition of repose, a compression spring 44 surrounding the lower part of the plunger lower body 24 and extending between the lower limit member 42 and the throat 18 urges the plunger 12 to the upper end of the upper chamber 14 as shown in FIG. 2.

To provide an outlet for liquids from the upper chamber 14, an axially extending outlet passage 46 extending upwardly of the plunger 12 through its lower and upper bodies 24 and 22 is provided. The lower end of the outlet passage 46 is constituted by an intersecting transverse radial bore or discharge port 48 which, when the plunger is in the raised position, is overlapped or blocked by the piston body 32 and inner lip 38 thereby preventing fluid communication between the pump chamber below the piston and the outlet passage 46. The inside surface of piston portion 32, 38 and the outside cylindrical surface of the lower plunger body 24 cooperate to form a sliding valve means for opening and closing the discharge port 48.

In operation the upper end of the plunger 12 is pressed downwardly. During an initial movement the upper end of the lower passage 28 in the plunger moves below the throat 18 preventing fluid flow from the upper chamber through the lower passage and then, as a result of a slight build up of pressure and with friction between the piston and the chamber wall, the plunger slides downwardly through the piston to move the lower end 48 of the outlet passage into the upper chamber 14. The same initial movement also brings the upper limit member, the flange 40 on the lower end of the upper plunger body, into contact with the upper surface of the piston body 32. Continued downward movement carries the piston assembly downwardly of the chamber 14 so that the liquid trapped in the upper chamber is expelled through the outlet passage 46. During the downward motion the hydraulic pressure in the upper chamber presses the lower flange 36 of the piston, which is made of a plastic having at least a limited degree of resilience, against the chamber wall to increase the sealing effect. Usually a right angled spray nozzle will be affixed to the upper end of the outlet passage, which constitutes the liquid outlet, so a spray can be directed horizontally at any designed target. The spray may also be directed vertically.

When the plunger 12 reaches a depressed position at the bottom of its downward travel, in which the piston 30 is located at the lower end of the pump chamber 14, further downward motion is prevented because the coils of the spring 44 reach a rigid, fully compressed condition. Pressure is then removed from the plunger 12 so that the compression spring 44 expands causing an initial upward movement of the plunger from the depressed position. During this initial upward movement friction against the chamber wall again tends to hold the piston immobile so that the plunger travels upwardly through the piston until the lower limit member, the flange 42, is moved into contact with the underside of the lower lip 38. At this time the piston slide valve closes sealing discharge port 48. Continued upward expansion of the spring 44 moves the piston upwardly creating a vacuum within the upper chamber. Finally, as the plunger approaches its initial, raised position, the upper end of the lower passage 28 moves above the throat 18 placing the upper chamber 14 in communication again with the liquid in the lower chamber 36. At this time, air pressure within the container (admitted in a manner to be described hereinafter) acts on the liquid so that it is forced into the low pressure area within the upper chamber created by the upward motion of the piston, thereby priming the upper chamber with liquid ready for the next downward stroke of the plunger.

Thus, the central housing, the lower transverse wall and the piston constitute a variable volume pump chamber. This is the basic type of pump disclosed in my prior U.S. Pat. No. 3,211,346. However, unlike that pump which relies on a rubber seal at the bottom of the pump and a rubber piston, the present pump, except for the spring, is made completely from molded plastic parts. More significant, is the fact that the present pump does not require a pressurized container but is instead vented so that ambient air pressure which is admitted to the container in a manner to be described below, is all that is required to refill the chamber. The various embodiments to be disclosed admit air to the container when required during pumping action but exclude air and prevent leakage when the pump is in repose. This avoids unwanted losses of the contents through evaporation and renders the pump leak proof if it is inverted. In one embodiment, structure for this purpose includes an annular, horizontal sealing ring or disc 50 of resilient material which is fixedly mounted between the upper end 6 of the pump body 4 and the adjacent engaging portions 8 of the mounting cup or container providing a permanent seal therebetween. The sealing disc 50 overhangs the interior of the pump body extending horizontally and radially inwardly relative to the longitudinal axis of the upper chamber 14 about its upper periphery with the inner radial edge of the sealing disc 50 abutting the exterior peripheral surface of the upper plunger body 22 to form a frictional sliding fit. The container or mounting cup portions adjacent the central opening 10 are generally horizontal and overlie the upper surface of the sealing disc 50 in contiguous relation therewith. The edge of the container around the central opening 10 is bent upwardly to form a collar 52 surrounding, but closely spaced from the upper body 22 of the plunger to provide an air gap therearound open to atmosphere.

Figure 3:
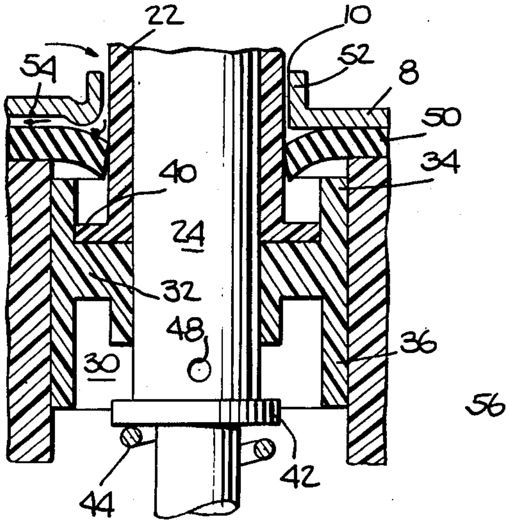
FIG. 3 is a cross-sectional side view on an enlarged scale of a portion of the pump assembly shown in FIG. 2 but with the plunger moved through an initial downward movement from its raised position.

A first opening between the pump body and the container is formed by providing a narrow channel or groove 54 at one location in the portions 8 of the container engaging the pump body. The channel 54 extends from the interior of the container around the exterior of the bulbous region 6 at the upper end of the pump body and across the upper surface of the sealing disc 50 to a point spaced radially from the inner radial edge of the sealing disc. With the plunger in the raised position the upper end of the annular flange 40 on the upper plunger body 22 forces the upper surface of radially inner edge of the sealing disc 50 firmly against the underside of the collar 52 forming a tight seal therewith which prevents the passage of air between the first opening constituted by the channel 54, which does not extend as far as the collar 52, and a second opening constituted by the annular gap between the collar 52 and the upper plunger body 22. As the plunger is moved downwardly (FIG. 3), however, the underlying support for the sealing disc provided by the flange 40 is removed. At the same time frictional resistance between the inner peripheral edge of the sealing disc 50 and the exterior surface of the plunger body 22 carries the inner edge downwardly. The downward deflection is sufficient to move the upper surface of the sealing disc 50 out of contact with the underside of the collar 52 placing the channel 54 in fluid communication with the gap between the collar 52 and the plunger body so that air can pass to the interior of the container. On return of the plunger to the raised position the seal is remade, fluid communication with atmosphere is cut off and evaporation of the contents is prevented. The frictional coupling thus provided minimizes damage to the sealing disc adjacent its inner edge by the avoidance of fixed gripping surfaces which could cause severe local wear during repeated deflections.

Instead of a flange 40 to cause the sealing disc 50 to seal off the passage by abutment, the same function can be accomplished by having sufficient frictional contact between the inner periphery of the sealing disc and the exterior surface of the plunger body such that the sliding frictional contact therebetween is sufficient to hold the disc sealingly against the vent passage and seal the container when the plunger is in the raised position. The flange 40 could be eliminated and any other means provided to keep the plunger from flying out of the pump chamber.

Even in the up position of the plunger (FIG. 2) the upper end of the upper flange 34 of the piston is spaced below and out of contact with the underside of the sealing disc 50 so that it does not hamper the free downward deflection of the sealing disc as the plunger is moved downwardly.

Figure 6:
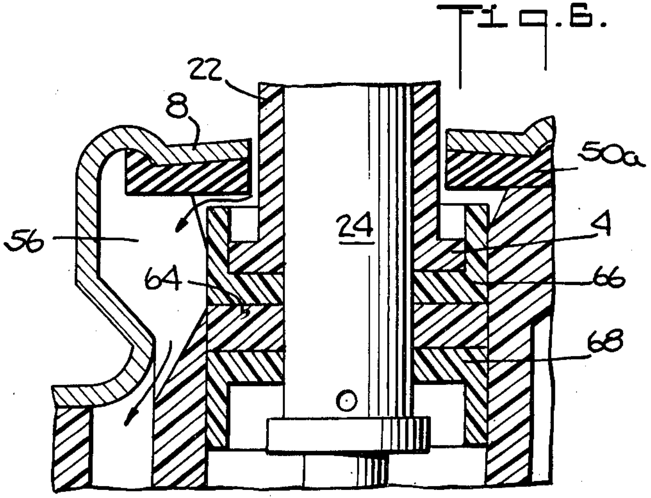
FIG. 6 is a cross-sectional side view on an enlarged scale of a portion of the pump assembly shown in FIG. 5.
Figure 5:
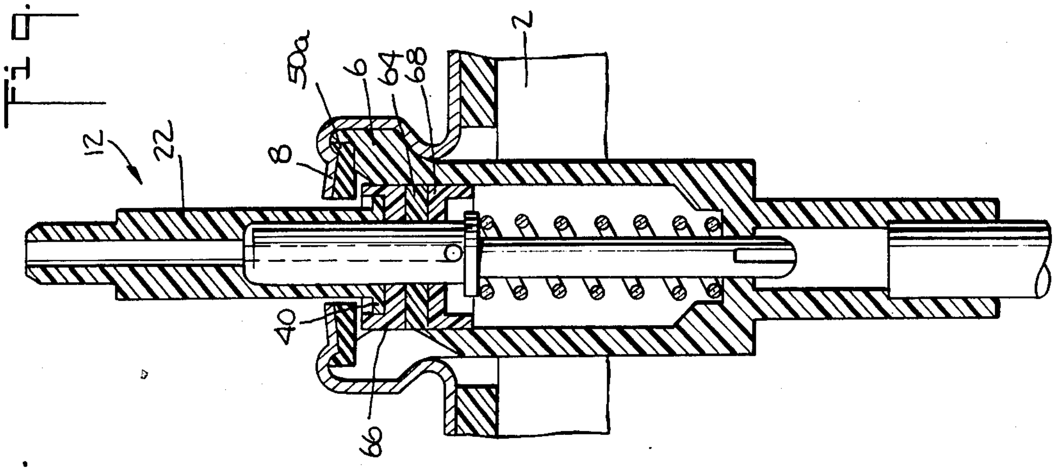
FIG. 5 is a cross-sectional side view of the pump assembly shown in FIG. 4 in which the plunger has been moved through an initial downward movement from its raised position relative to the pump body.
Figure 4:
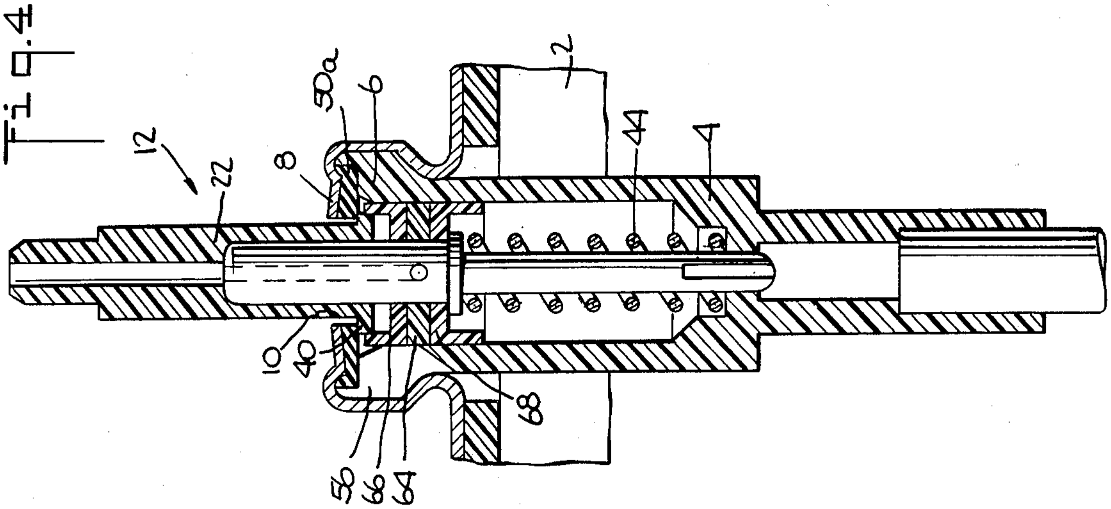
FIG. 4 is a cross-sectional side view on an enlarged scale of a second embodiment of the invention, including a pump body and plunger, with the plunger shown in a fully raised position relative to the pump body.

A second embodiment of the invention shown in FIGS. 4–6 has corresponding structure to the first embodiment except for the differences hereinafter to be discussed. In the second embodiment a sealing disc **50*a*, mounted between the upper end of the pump body and the adjacent engaging portions of the container, has its inner peripheral edge aligned with the edge of the central opening 10 in the top of the container in closely spaced relation from the exterior peripheral surface of the upper plunger body 22. The container portions adjacent the central openings 10 are generally horizontal and overlie the upper surface of the sealing disc 50*a*** in contiguous relation therewith.

The sealing disc **50*a* constitutes one element of a releasable seal assembly whose other element is constituted by the flange 40 on the upper plunger body 22. The flange 40, when the plunger is in the raised position (FIG. 4), is urged firmly against the underside of the sealing disc 50*a* by the compression spring 44. The seal thus provided prevents fluid communication between a first opening 56 extending through the pump body wall from the interior of the container to the upper chamber 14 above the piston and a second opening constituted by the annular gap between the central opening 10, the adjacent inner peripheral edge of the sealing disc 50*a* and the exterior peripheral surface of the upper plunger body 22. The opening 56, which takes the place of the channel around the upper pump body of the first embodiment, is conveniently formed as a narrow slot in the enlarged portion at the upper end of the pump body extending through the body from the interior of the container 2 to communicate with the upper chamber 14** above the position occupied by the piston in the up configuration.

During a depression stroke of the plunger the flange 40 moves out of contact with the sealing disc **50*a*** breaking the seal. At this time the first and second openings communicate (FIG. 6) to provide a fluid passage from atmosphere to the interior of the container so that air can flow through and pressurize the interior of the container to atmospheric pressure. The seal is remade on return to the raised position.

A composite piston construction may be employed in place of the integral piston 30 used in the preferred embodiment. Such composite piston (FIGS. 4–6) includes a resilient sealing ring 64 extending radially between the upper, enlarged diameter portion of the plunger lower body 24 and the adjacent interior wall surface of the upper chamber 14, in sealing relation with both. Extending above and below and affixed by any convenient method to the sealing ring 64 are upper and lower stabilizing rings 66 and 68 respectively. Each stabilizing ring comprises a rigid annular body generally coextensive with and contacting the sealing disc 64 and provided about its periphery with an annular flange extending axially away from the sealing disc in loose sliding contact with walls of the upper chamber to stabilize and guide the sealing ring 64. In the up position of the plunger 12 the top edge of the flange on the upper stabilizing ring 66 is spaced below and out of contact with the underside of the sealing disc 50*a*.

Figure 7:
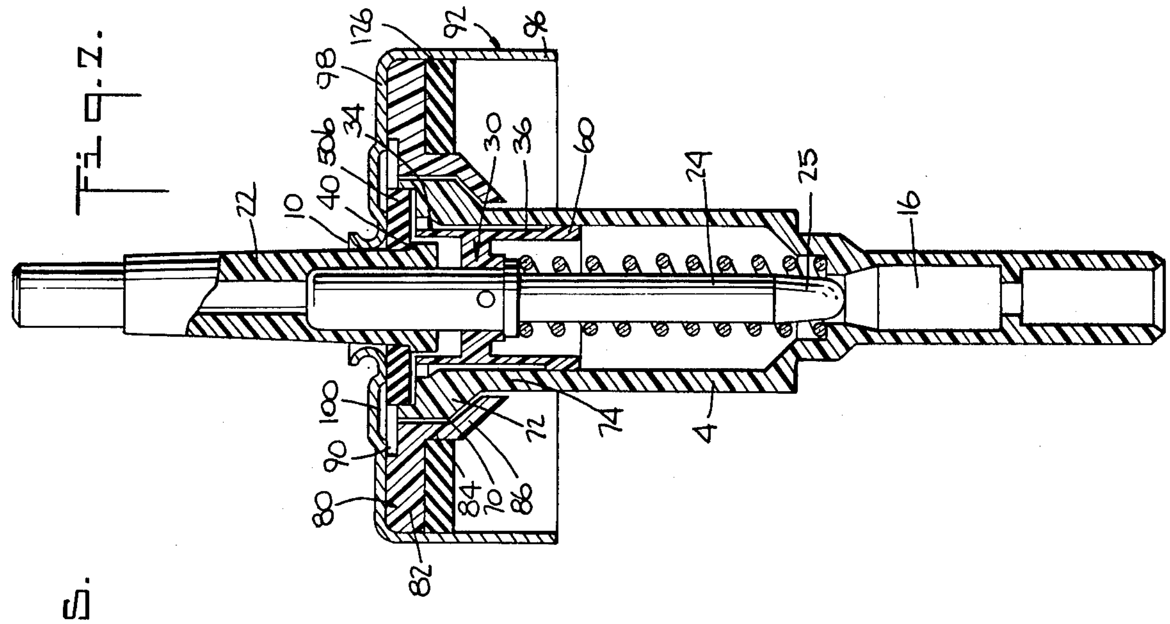
FIG. 7 is a cross-sectional side view on an enlarged scale of a third embodiment of the invention including a pump body, plunger, low friction piston, flange adaptor and flush-type mounting cup, with the plunger shown in a fully raised position relative to the pump body.

A third embodiment of the invention is shown in FIGS. 7–12 and has structure corresponding to the first embodiment except for the differences hereinafter to be discussed. In FIG. 7 the lower plunger body 24 is tapered at its end 25 such that when the plunger is in the raised position, the dip tube 16 is in communication with the pump chamber 14, and when the plunger is moved downwardly slightly, the lower plunger body 24 enters the throat 18 to the point beyond the tapered end 25 and seals off communication between the pump chamber 14 and the dip tube 16.

The upper plunger body 22 in this embodiment has a tapered exterior surface and is in sliding, sealing frictional contact with the inner peripheral edge of the sealing disc 50*b* when the plunger 22 is in the fully raised (extended) position. This seal helps to keep the pump chamber above the piston fluid tight but it is not a vent seal. The vent seal is formed by the flange 40 of the upper plunger body 22 when in the up position pressing the sealing disc 50*b* firmly against the overlying mounting cup portions. Both seals are broken upon downward motion of the plunger.

Figure 8:
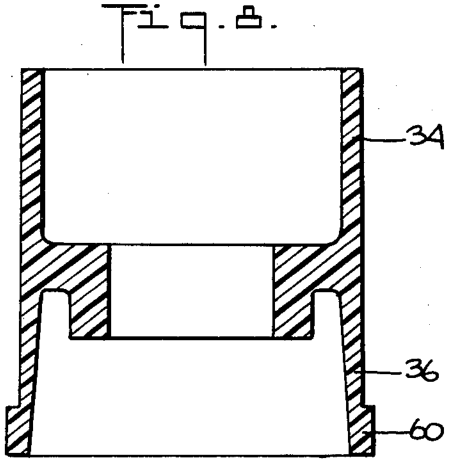
FIG. 8 is a cross-sectional side view on an enlarged scale of the low friction plastic piston of FIG. 7.
Figure 9:
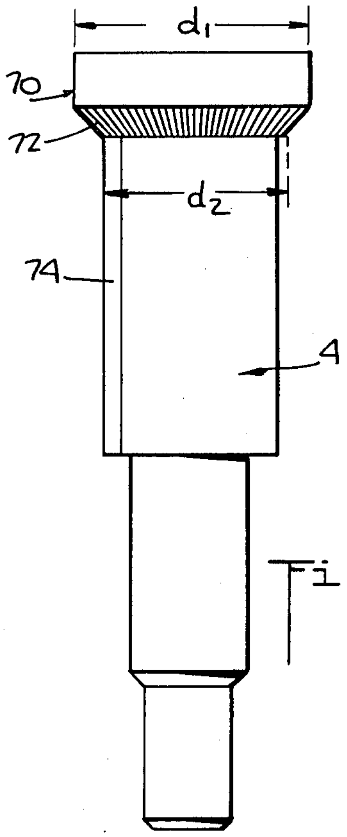
FIG. 9 is an elevation side view on an enlarged scale of the pump body of FIG. 7 showing the location of the rounded knurls on one inclined exterior surface which form a portion of the air passage.

The piston 30 of this embodiment is a low friction piston in that the lower flange 36 has its bottommost portion 60 of greater outside diameter than upper and lower flanges 34, 36, as clearly shown in FIG. 8. The inside diameter of the pump chamber 14 is intermediate the outside diameter of the piston flanges 34, 36 and the outside diameter of end portion 60 thereof. Since the piston 30 is made of plastic and is flexible, the end portion 60 bends inwardly when inserted into the pump chamber 14 and forms a seal with the chamber wall, whereas the remainder of the flanges 34, 36, being of smaller outer diameter, assists in guiding the piston within but normally is not in contact with the chamber wall thus significantly reducing friction during operation. The upper end of upper flange 34, as in previous embodiments, is not in contact with the sealing disc when the plunger is in the full up position.

In this embodiment the method of mounting the pump body to the container and of forming the vent passage are also altered. The structure which accomplishes these purposes includes a pump body 4 having a head portion 70 of a first predetermined diameter $d_1$, a neck portion 72 and a main body portion 74 of a second predetermined diameter $d_2$. Only the neck portion 72 is preferably formed with a plurality of knurls or ribs or protuberances spaced circumferentially around and protruding from the surface thereof. The exterior surface of the knurls may be rounded. Between the exterior surfaces of any two adjacent knurls is a generally "V" shaped space which, in combination with a contiguous or adjacent overlying cooperable surface, forms a plurality of passageways around the pump chambers which constitute a portion of the vent passage so as to permit the passage of air therebetween, as clearly shown in FIGS. 7, 9, 10. Optionally, however, head portion 70 and main body portion 74 may also be formed with rounded knurls on their exterior surfaces. The main body portion 72 is triangular-shaped with rounded edges.

Figure 11:
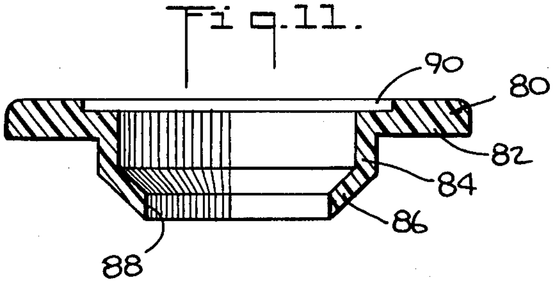
FIG. 11 is a cross-sectional side view on an enlarged scale of the flange adaptor of FIG. 7 showing the optional rounded knurls on three interior surfaces.

The pump body 4 is mounted within and supported by a flange adaptor generally designated 80 in FIGS. 7, 11. Flange adaptor 80 is formed with flange portion 82, a depending cylindrical portion 84 and an inclined neck portion 86 having a central bore 88. The inside diameter of the cylindrical portion 82 and of the central bore 88 are larger than the predetermined diameters $d_1$, $d_2$ of the pump body head 70 and main body portion 74, respectively, and provide a loose fit and a clearance therebetween so that when the pump body 4 is assembled within the flange adaptor 80, there is clearance for fluid communication from the inside of the container 2 to the top of the flange adaptor and pump body through the continuous fluid passage formed between the inside surfaces of the flange adaptor 80 and the outside surfaces of the pump body 4. The fluid passage also extends 360° around the adaptor and pump body. Preferably if the pump body has knurls, they are omitted from the flange adaptor 80. However, optionally the three inside surfaces of the flange adaptor are all formed with rounded knurls as shown in FIG. 11. By putting knurls on the vertical interior surfaces of the flange adaptor or the vertical exterior surfaces of the pump body it is possible to assure a tight frictional fit between the flange adaptor and the pump body while maintaining proper venting and such a construction is preferred. The top surface of adaptor 80 is recessed as at 90 of FIG. 7 to insure 360° fluid communication for venting.

Figure 12:
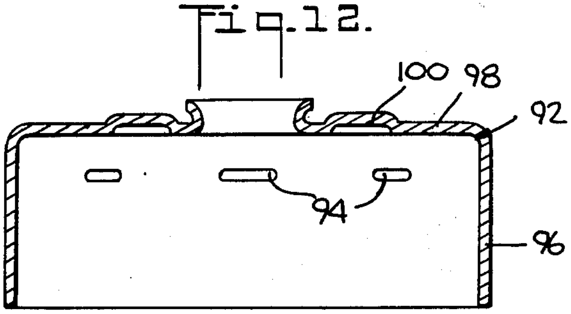
FIG. 12 is a cross-sectional side view on an enlarged scale of the flush-type mounting cup of FIG. 7 showing detents for securing the flange adaptor.
Figure 10:
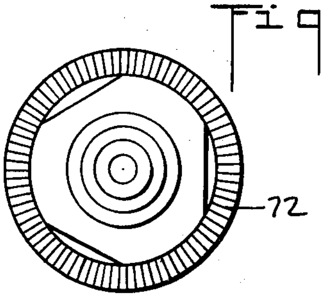
FIG. 10 is an elevation bottom view of the pump body of FIG. 9.

The flange adaptor 80 is secured to the mounting cup, generally designated 92 in FIGS. 7, 12, by detents 94. Mounting cup 92 is a flat or flush-type mounting member with a depending flange portion 96 and a lateral mounting portion 98 which is formed with a radial channel 100 extending from a point axially above recess 90 of the flange adaptor 80 and across the upper surface of sealing disc 50*b* to a point spaced radially from the inner radial edge of the sealing disc. The mounting member 92 is secured to and becomes a fixed portion of the container by screwing it to the container or by crimping or rolling around depending flange 96 below sealing ring 126. Sealing ring 126 may be rubber or plastic or may be omitted entirely using the underside of flange portion 82 as the sealing surface.

As in previous embodiments the flange 40 of the upper plunger body 22 in the up position forces the sealing disc 50*b* sealingly against the overlying mounting cup portion preventing venting. When the plunger is moved downwardly a short distance, the frictional resistance between the inner peripheral edge of the sealing disc 50*b* and the periphery of the plunger 22 is sufficient to cause the inner edge of the disc to deflect downwardly (see FIG. 3) and vent the container by permitting air to flow from atmosphere to the fluid in the container through the gap at the central bore 10, the channel 100, the recess 90 and the fluid passage between the cooperating continguous or adjacent surfaces of the respective flange adaptor and pump body portions 82 and 70, 84 and 72, 88 and 74.

The venting structure of this embodiment, together with the low friction piston has been found to provide a pump which breathes easily, requires very little finger pressure to operate and is highly efficient and reliable in addition to being effectively leak proof when not in use.

Figure 14:
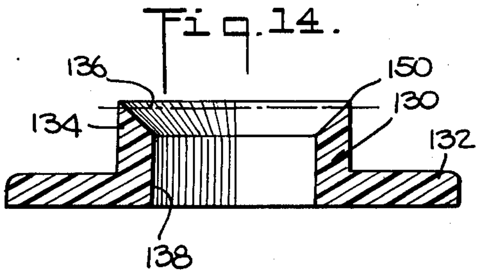
FIG. 14 is a cross-sectional side view on an enlarged scale of the modified flange adaptor of FIG. 13 showing the optional rounded knurls on two interior surfaces.

A fourth embodiment of the invention is shown in FIGS. 13 and 14 and has structure corresponding to the second embodiment except for the differences hereinafter to be discussed. Upper plunger body 22 is straight rather than tapered. The pump body 4 is formed with the rounded knurls at its neck portion 72 as previously shown in FIG. 9.

The primary difference in this embodiment is the flange adaptor generally indicated as 130 in FIG. 14 and the mounting cup generally indicated as 140 in FIG. 13. As in the prior embodiment the pump body 4 is mounted within and supported by the flange adaptor 130. Flange adaptor 130 is formed with a flange portion 132 and a central cylindrical bore 134 which has a bevelled end 136. The central cylindrical portion 134 has a central bore 138. Optionally the two inside surfaces of the flange adaptor are formed with rounded knurls as shown in FIG. 14. The diameter of the central bore 138 is larger than the outside diameter of the main body 74 of the pump body to provide a clearance therebetween. Further, the triangular shape of pump body guarantees a clearance for passage of air between the pump body and the central bore 138.

The flange adaptor is mounted within and secured to the mounting cup by detents 94 as shown in FIG. 13. The mounting cup has a depending flange portion 142, a lateral mounting portion 144 and a cental raised housing portion 146 having a central bore 10 the diameter of which is greater than the outside peripheral surface of the upper plunger body 22 to provide a gap therebetween. As previously described the inside surface of the mounting cup 140 is formed with a channel 54 which extends from the lateral mounting portion 144 vertically around the bulbous neck and head portion of the pump body and over the upper surface of the sealing disc **50*b* to a point spaced radially from the inner radial edge of the mounting cup at the central bore 10**.

When the pump body is mounted within the flange adaptor, which members are then mounted in the mounting cup and secured by detents 94, the pump assembly is ready to be mounted on the container and to be secured thereto by screwing it thereto (threads not shown) or by rolling or crimping depending flange 142 below sealing ring 126, which, again, is optional.

the pump functions as in the previous embodiments. The venting passage is opened when the upper plunger body 22 is moved slightly downwardly and the air flow to vent the container is through the passage formed by the gap at central bore 10, the channel 54, between the knurled ribs of the pump body and the flange adaptor and into the container.

Optionally the very tip 150 of the bevelled surface 136 of the flange adaptor 130 shown in FIG. 14 may be flattened to provide, when the pump body is mounted therein, an annular space surrounding the pump body. This annular space will guarantee the fluid communication 360° around the pump body and not only makes the pump breathe easily but also assures efficient operation.

Figure 16:
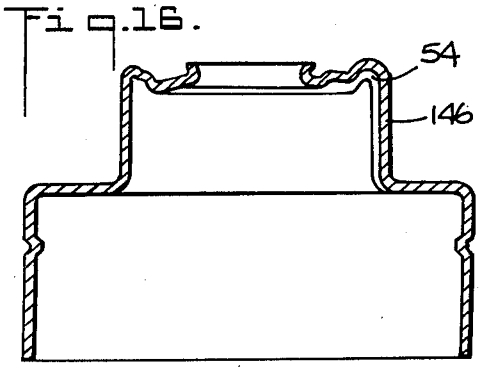
FIG. 16 is a cross-sectional side view on an enlarged scale of the mounting cup of FIG. 15.

The next embodiment is shown in FIGS. 15 and 16. This version operates similarly to the previous embodiments except that there is no flange adaptor. The pump body 4 is the same as that shown in FIG. 9. The mounting cup is the same as that shown in FIG. 13 except for the absence of the flange adaptor. The pump body is secured to the mounting cup by crimping in the central housing portion 146 and the mounting cup is thereafter secured to the container by screwing (threads not shown) or by crimping in the depending flange portion 142 below the sealing ring 126 (ring 126 is optional).

The channel 54 provides fluid communication from atmosphere to the inside of the container when the upper plunger body 22 is moved slightly downwardly. The rounded knurls 72 of the pump body guarantee that the air will flow freely past the crimped portion of the mounting cup eliminating potential blockage of the channel 54 during crimping.

Figure 21:
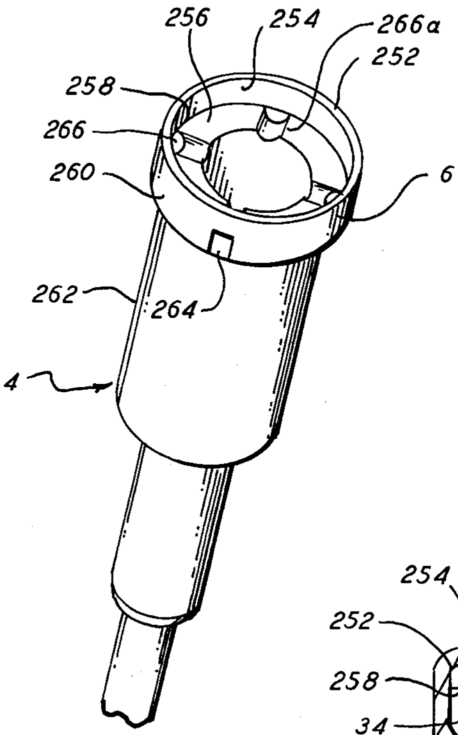
FIG. 21 is a cross-sectional view of a pump having the venting means of FIG. 20.
Figure 20:
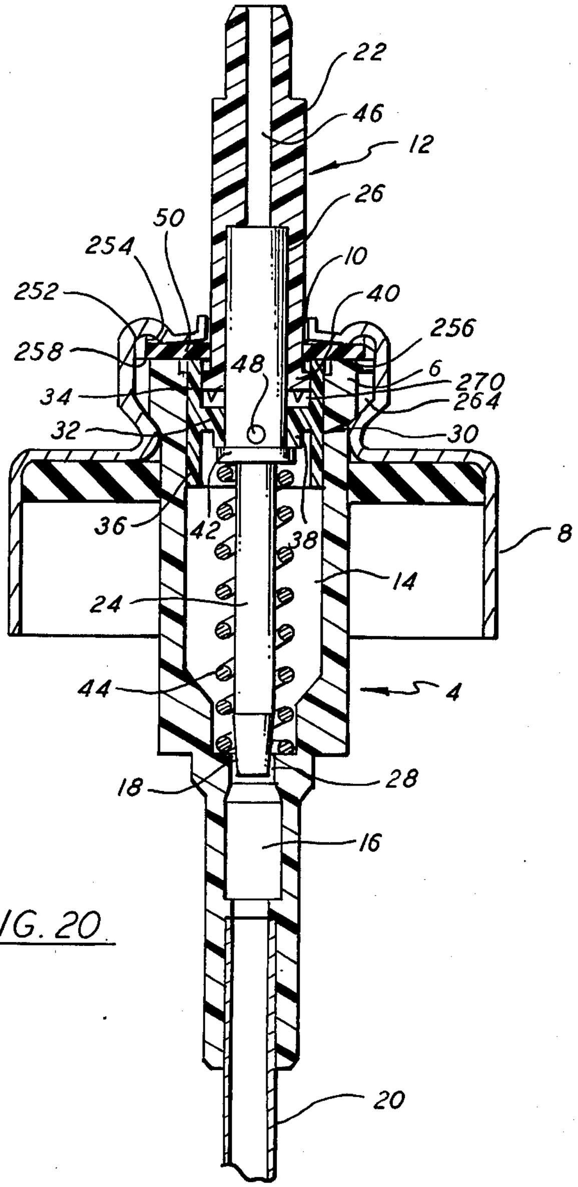
FIG. 20 is a perspective view of a pump body containing venting notches in the side of its enlarged upper end.

Although the previously disclosed arrangements for venting operate effectively, the preferred venting arrangement is that shown in connection with FIGS. 20 and 21. FIG. 20 is a cross-sectional view of the dispensing unit incorporating this preferred type of venting. FIG. 21 is a perspective view of the pump body containing these venting means. Operation of the pump is essentially as described in connection with the previous embodiments and only the differences for carrying out the venting will be described in detail.

The sealing disc 50 is mounted between the upper end of the pump body and the adjacent engaging portion of the container and has its inner peripheral edge concentric with the central opening 10 in the container. As clearly illustrated on the drawing, the diameter of the opening in the sealing disc 50 is smaller than the diameter of the central opening 10 and the sealing disc 50, in the position shown, engages the plunger 12. The plunger 12 it should be noted has a slight taper so that as it is moved downwardly a gap will appear between the sealing disc 50 and the upper portion 22 of plunger 12. As illustrated, in the at rest position, the upper flange 34 on the piston 30 is pressing the sealing disc 50 against the top surface of the mounting cup 8 to form an air tight seal. Thus, there is provided a double seal the first seal being provided by contact between the upper portion 22 of plunger 12 and the sealing disc and the second between the upper flange 34 on piston 30 and the sealing disc. This insures that the container to which the pump is attached will be leak proof. Although the flange 32 is shown as engaging the disc 50 it is also possible to construct the pump in the manner illustrated above on FIG. 4 such that the flange 40 engages the disc instead.

Upon depression of the plunger 12, a passage from the outside to the area above the portion 32 of the piston will occur. However, means must be provided to permit the air to get from that position into the interior of the container. In accordance with the present invention this is accomplished through a special shaping of the valve body 4. This construction is illustrated in the perspective view of FIG. 21.

At the top of the enlarged portion 6 of the valve body is an annular rim 252. The annular rim 252 has an inside vertical wall 254 which intersects a bottom portion 256, on which the sealing disc 50 rests, at a line 258. These portions are also indicated on FIG. 1. The outside wall 260 of the enlarged portion 6 extends vertically downward and then angles inwardly to meet the outside wall 262 of the central portion of the valve body. In this outside wall a plurality of semi-circular notches, 264, for example, four such notches equally spaced, are formed. The notches extend from the bottom edge of the enlarged portion 6 to a level corresponding to the level of the line 258. Their depth is such as to cut into the bottom portion 256 to form a plurality of semi-circular holes 266 in the bottom portion 256 on which the sealing disc rests. Those are extended to the central opening as channels 266*a*. The notches 264 thus form a plurality of passages from the bottom surface 259 into the interior of the container. It should be noted that the structural integrity of the enlarged portion 6 is essentially maintained with the exception of the small notches. At the top where the annular wall 252 is formed structural integrity throughout the full circumference is maintained. As a result, no complicating shaping of the mounting cup nor complicated crimping processes are necessary.

In operation, as the plunger 12 is depressed, the taper of the plunger results in a gap being opened between it and the sealing disc 50 to permit air to flow through channels 266*a* under the sealing disc 50. Air may also flow over the top of the sealing disc, the seal between the disc and the mounting cup having been released as the upper flange 34 of the piston 30 is moved away. This air flow under the bottom of the sealing disc 50 through channels 266*a* reaches the edge 258 inside the enlarged portion 6 at which point it flows through the opening 266 and notches 264 into the interior of the container to replace a volume therein equal to the volume dispensed. After the pumping cycle, the piston 30 returns to the position shown and its upper flange 34 again seals the sealing disc against the mounting cup 8. The channels 266*a* are not completely essential. Instead, the thickness of the sealing disc 50 may be selected such as that when the mounting cup 8 is crimped over the enlarged portion 6 of the valve body, only a minimal seal will result which can be overcome by the difference in pressure of the outside ambient air and the air inside the container once a portion of the liquid has been removed. This will permit movement of air either above or below the sealing disc. In such an embodiment in the at rest position there will be essentially three separate seals. The first of these is the seal between the mounting cup and the bottom 56 of the top portion of the valve body through the sealing disc 50. This seal although insufficient to permit air from passing into the interior of the container still is sufficient to inhibit the flow of the liquid contained therein. Past this seal is the seal made by the sealing disc 50 between the pump body and the mounting cup 8. Finally there is a seal between the disc 50 and the plunger 12. As a result a slight defect in any one of the three seals is unlikely to result in spillage of liquid. For liquid to spill from the container it is necessary that all three seals be substantially opened.

It should also be pointed out that the construction of the valve body shown on FIG. 20 is of a particular simplicity. Clearly a mold with the illustrated notches presents no difficulty.

Another feature shown on FIG. 20 is an annular seal 270 formed on the bottom of the upper portion 22 of stem 12. This annular seal 270 seals against the piston 32 when the plunger is pressed downward. This prevents any of the material from leaking around the upper portion of the plunger 12 and out through the gap which will be formed between the stem and the sealing disc.

Figure 22:
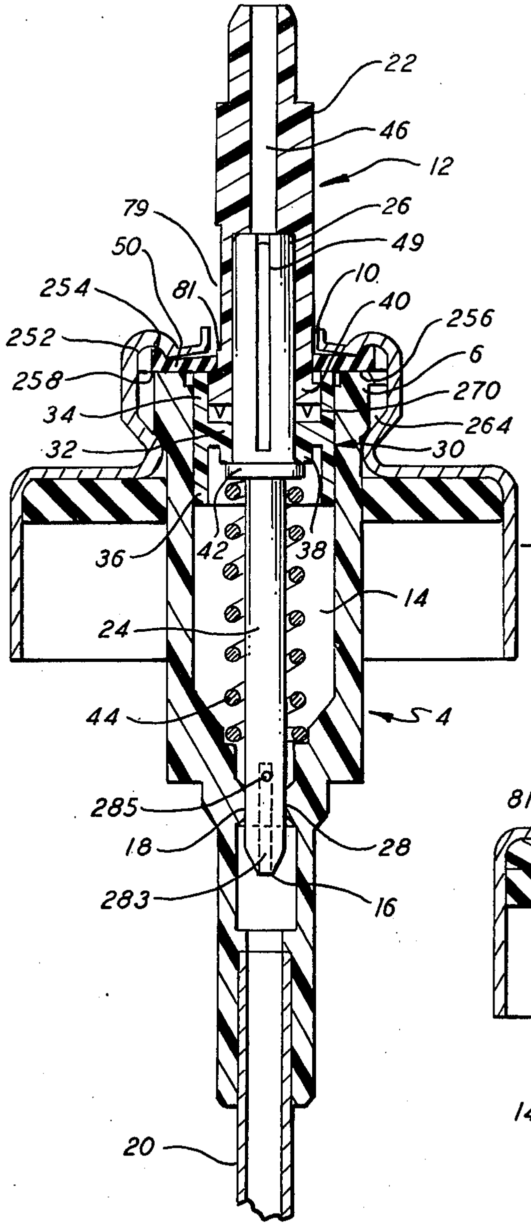
FIG. 22 is a cross-sectional view of a further embodiment of the present invention using notches to communicate between the pump chamber and the pump outlet.

Such an annular seal is particularly important in the embodiment of FIG. 22. In this embodiment, the discharge port 48 and the central passageway in the portion 26 of the stem are replaced by one or more grooves 249 in that portion of the stem. Preferably, a number of grooves such as four grooves, will be used which open into the passageway 46. Such grooves are less likely to clog when the pump is used with a material such as hair spray and furthermore, where a plurality of grooves are used, should one be clogged, there will still be additional grooves available. It should be noted that the use of similar grooves for dispensing large quantities of liquids is disclosed in my previous U.S. Pat. No. 3,332,626.

Grooves may also be used for venting as also shown on FIG. 22. That embodiment, which is essentially the same as the embodiment of FIG. 20, instead of using a tapered upper stem portion uses a straight stem with grooves or channels 79 formed therein. The grooves terminate at a point 81 which is above the sealing disc 50 when the stem is in a raised position but which moves therebelow when the plunger is pushed downward to admit air into the container. One or more of these channels 79 may be used. This figure also illustrates a different type of valve arrangement at the bottom of the chamber. Rather than using a tapered stem or flanged a stem walls are always in contact with the opening in the bottom of the chamber is used. In order to obtain the necessary valve action, the stem contains a hollow portion 283 communicating with a radial port 285. In the position shown, the passageway 283 is in communication with the chamber 16 permitting material to flow therethrough and through the port 285 into the chamber 14. However, as the stem is depressed, the port 285 is closed by the walls of the opening 28 to permit the type of pumping action described above. Also illustrated is the fact that the spring is elevated so that it is above the sealing area of the stem. This prevents any scoring of the stem. This particular improvement is disclosed in detail and claimed in my co-pending application Ser. No. 630,953 filed Nov. 12, 1975.

Figure 23:
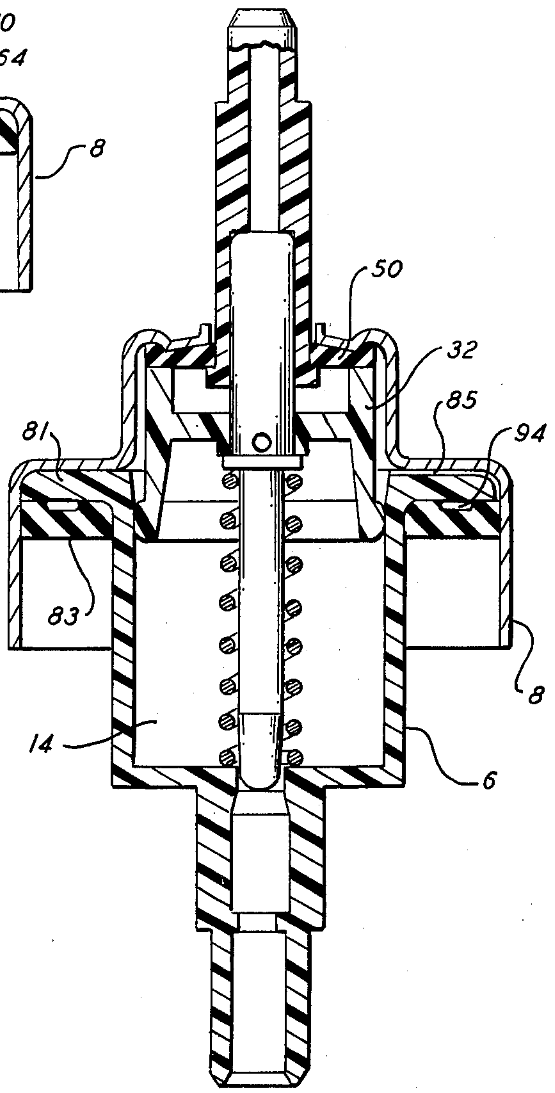
FIG. 23 illustrates a further embodiment of the present invention having an enlarged pump chamber.

As is evident from the discussion above, the pump of the present invention is useful with volatile substances such as perfumes. Since these are usually dispensed in small amounts the relatively small size of the chamber 14 from which material is dispensed can be tolerated. However, in some instances greater amounts of liquid must be dispensed. An embodiment of the present invention which permits dispensing larger amounts of liquid is shown on FIG. 23. Here the pump body 6 instead of having an enlarged upper portion, terminates in a flange 81 which fits into the mounting cup 8 and has a diameter essentially equal to the inner diameter of the larger portion thereof. This permits using a much larger chamber 14. The piston 32 still extends all the way up to the sealing disc 50. In other respects, operation of the pump is the same as described above. The pump is held in place by the crimping of the mounting cup onto a bottle at which time the gasket 83 will be compressed holding the flange 81 tightly against the mounting cup to hold the pump in place. In addition detents 94 as in the embodiment of FIG. 13 are also used. Venting to the inside of the container takes place through appropriate channels 85 formed in the flange 81.

Figure 24:
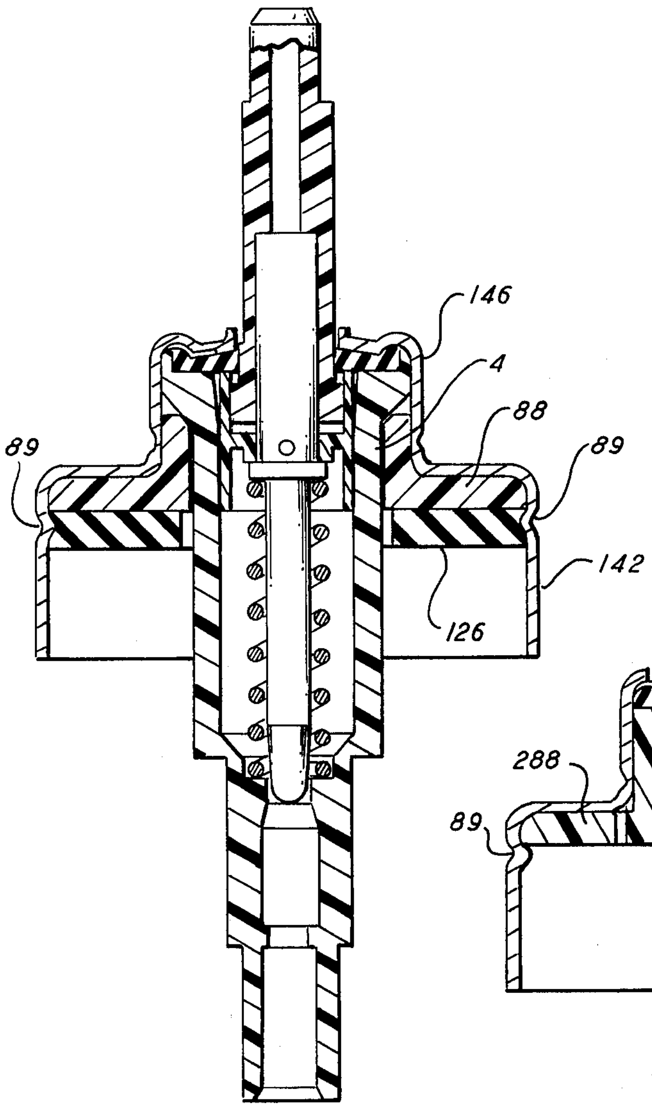
FIG. 24 illustrates an embodiment using a flange disc to insure retention of the pump even when subjected to large pressures.

With some material which can cause clogging of the pump, the force required to overcome clogging for example in the radial passageway 48 of FIG. 20 can be great enough to force the pump body 6 out of the crimp made in the mounting cup 8. To overcome this problem the construction shown on FIG. 24 can be used. In this embodiment, which is quite similar to the embodiment of FIG. 3, the mounting cup has a lower larger cylindrical section defined by flange 142 and an upper smaller cylindrical section 146. The pump body at its end has an enlarged cylindrical portion fitting into this smaller diameter. It will contain notches 266 and 264 such as that shown in connection with FIG. 21. However, in this embodiment the top of the pump body may be made flat without the annular portion 52 since crimping does not take place. A shoulder is formed at the bottom of this enlarged system which engages an annular plastic disc 88 which is snapped into the enlarged portion of the mounting cup around the pump body. Detents 89 are formed in the mounting cup 8 to permit this disc 88 to be snapped in place to retain the pump in the mounting cup. The mounting cup is then crimped on to a bottle whereupon the bottom of the disc 88 will rest on the top of the bottle securing holding the pump in place against whatever force is applied.

Figure 25:
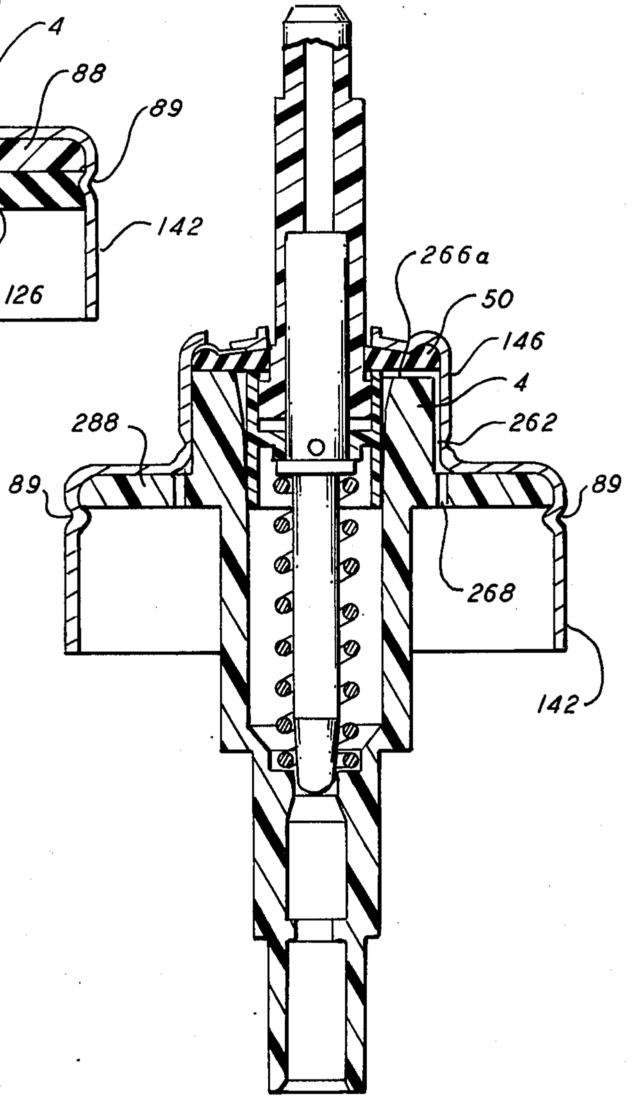
FIG. 25 illustrates an alternate of this embodiment in which the flange is an integral portion of the pump body.

As an alternative, the annular disc 88 may be made integral with the pump body so that the body and disc can be snapped into place in one operation as illustrated by FIG. 25. In this embodiment the top of the pump body 4 is flat. venting is through slots 266, 264 and holes 268 in the integral flange 288 of the body 4.

Figure 26:
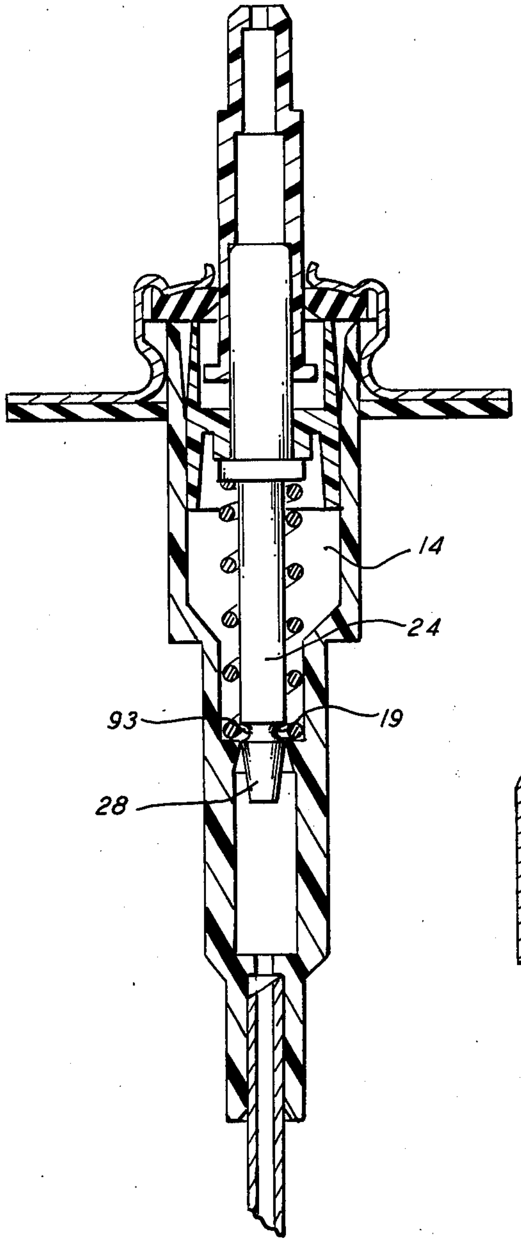
FIG. 26 illustrates a detent mechanism to aid in more even dispensing.

As noted above, an additional feature of the present invention resides in means for controlling the rate of travel of the piston downwardly through the chamber. If the piston is depressed with excessive force and rapidity, sufficient hydraulic forces may be developed within the pump body, which is normally manufactured only of plastic, to distort it out of round with the result that the fluid may leak past the piston or through the throat so that less than a full charge is dispensed. Alternatively, depressing the piston too slowly may result in an improper dispensing. To avoid uneven dispensing any one of a number of illustrated means may be used. The first of these is illustrated in connection with FIG. 26 which shows a cross-sectional view of a pump having a detent formed at the bottom of the chamber 14. The valve stem portion 24 contains a notch 91 which, as the stem is slightly depressed comes in contact with a detent 93 at the opening or throat 28. This restrains downward motion of the plunger causing the operator to build up a certain amount of pressure in his finger whereupon the detent will be overridden and operation take place as described above. Because the operator has built up this pressure, his finger will move downward in a smooth quick manner to accurately dispense the material within the chamber 14.

Figure 27:
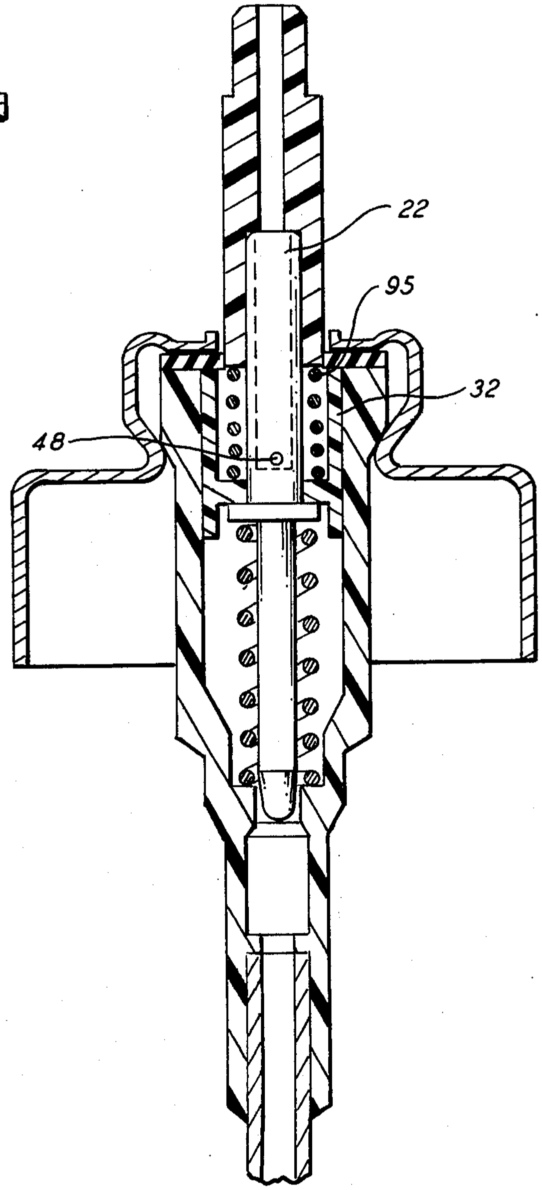
FIG. 27 illustrates an embodiment using an additional spring to gain prepressurization and obtain more even dispensing.

Another arrangement for obtaining the same effect is illustrated on FIG. 27. Construction of the pump is essentially as described above in connection with the previous figures except that a spring 91 is disposed between the bottom of the upper stem portion 22 and the piston 32. Initial downward motion of the stem results in compression of the spring 95 prior to the opening of the port 48. Once the port 48 opens, the spring is free to push the piston downward forcing out material in the chamber 14 and in essence makes up for any deficiency in the smoothness and quickness with which the operator presses the plunger.

Another manner of obtaining the desired type of action is disclosed in connection with FIG. 16. As shown, the upper end of the plunger upper body 22 is provided with a plunger head 102 having a radially directed spray nozzle 104 in communication with the outlet passage 46 in the plunger. The plunger head 102 is generally of inverted frusto-conical configuration and includes an annular skirt 106 extending downwardly to about the mid-point of the exposed portion of the upper plunger body 22 in its raised position. Slidably mounted on the plunger head 102 is a concentric tubular cap 108 having a closed upper end 110. A radial opening 109 in the cap 108 may be slid downwardly into alignment with the nozzle 104 in the plunger head to permit the outward passage of spray. Normally however, the nozzle area is closed off by the overlying wall of the cap 108 which is urged to an upward position by a compression spring 112 positioned between the upper end of the plunger head and the upper end 110 of the cap. Thus the cap serves to keep dirt and other contaminants out of the nozzle area when the device is not in use. Upward motion of the cap is limited by engagement between frusto-conical interior surfaces of the cop which matingly engage the plunger head and by an interior flange 114 which abuts the lower end of the plunger head.

When finger pressure is applied to the top wall 110 of the cap, downward movement of the upper plunger body 22 is initially prevented by a releasable detent structure designated generally as 116. The detent structure 116 includes a plastic housing 118 fixedly secured about the mounting cup portions 8 of the container 2, which engage the pump body. In the top wall of the housing 118 there are provided two diametrically opposed detents 120 positioned on opposite sides of the upper plunger body 22. Each detent is configured as a V-shaped member constituted by inner and outer arms 122 and 124, respectively, meeting at an apex which rests upon the upper surface of the container 2 adjacent the central opening 10 therein. The outer arm 124 of each detent 120 is integrally connected adjacent its mid-point to the adjacent horizontal upper wall of the housing 118 which is constructed of plastic and possesses a springy resilience. The inner arms 122 of the two detents slidingly contact the exterior surface of the upper plunger body 22 and at their upper ends abut the lower end of the previously mentioned skirt 106 on the plunger head 102 to prevent its downward motion.

In operation, as pressure is applied to the upper wall 110 of the cap 108, downward motion of the plunger head 102 is initially prevented by the detents 120 so the cap 108 starts to move downwardly with respect to the plunger head by telescoping over the plunger and compressing the spring 112. As the motion continues and the spring reaches a predetermined degree of compression, the lower end of the cap 108 impinges upon the inner surface of each of the outer arms 124 of the two detents 120. Further downward motion of the cap causes each detent to pivot outwardly about its apex, such pivoting motion being permitted by the resilient nature of the material of the housing 118 and the thinness of its upper wall which deforms. As depression of the cap continues the pivoting motion of each of the detents progresses until the inner arm 122 of each is pivoted sufficiently away from the plunger body to clear the lower end of the skirt 106 on the plunger head. At this time the spring suddenly expands driving the piston downwardly with a uniform acceleration through the upper chamber at a predetermined rate controlled by the preloading of the spring 112, thereby dispensing product through passage 46, spray nozzle 104 and radial opening 109 and obtaining a controlled atomization thereof.

When finger pressure is released at the conclusion of the downward stroke, expansion of the spring 112 restores the cap 108 to its upper position once again sealing off the nozzle area 104. Finally, as the plunger returns to the raised position, the resilience of the deformed upper wall of the housing 118 springs the inner arms of the detents back against the surface of the upper plunger body 22 beneath the skirt 106.

Figure 19:
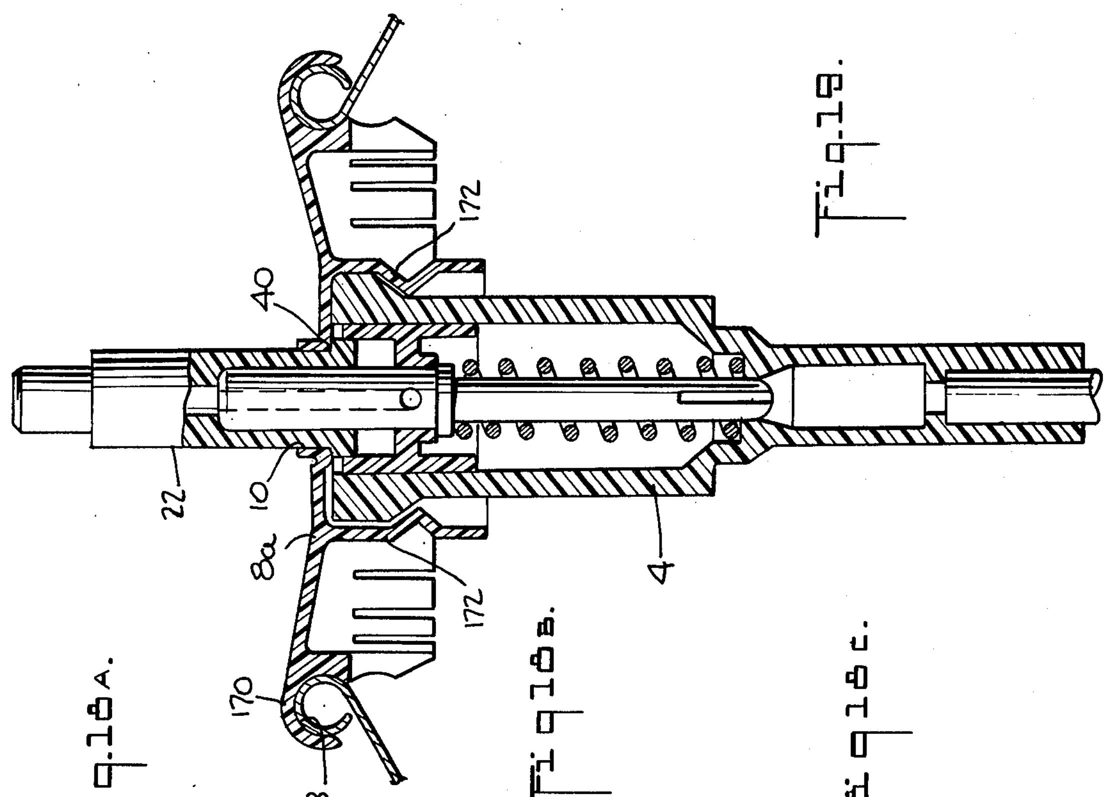
FIG. 19 is a cross-sectional side view similar to FIG. 18 and showing alternative constructions for snapping the plastic mounting cup onto the container and for snapping the pump body into the plastic mounting cup.

The applicant also conceives of a further embodiment which eliminates the use of the sealing disc 50 altogether. This embodiment is shown in FIGS. 18 and 19 in which the overlying container portion or mounting cup 8*a* is made of plastic. In the embodiment shown in FIG. 18 the exterior peripheral side wall surface of the plunger or stem 22 is tapered such that under the force exerted by spring 44, the plunger is driven up into tight wedging and sealing contact with the inner peripheral surface of central bore 10 of the mounting cup 8*a*. Since both the mounting cup and stem are made of plastic, their resilience is adequate to effect the up-position seal which closes the vent passage to atmosphere. It is noted that there is adequate spacial clearance between the underside of mounting cup 8*a* and the top of flange 40 to avoid contact between them such that there will continue to be an adequate wedging seal as aforesaid notwithstanding manufacturing tolerances and wear during operation of the pump by the end user.

Figure 18A:
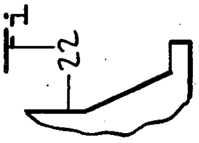
FIGS. 18A, 18B and 18C show additional versions of the stem construction to effect the seal.
Figure 18B:
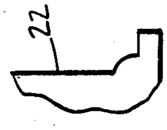
Figure 18C:
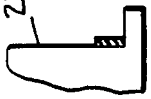
Figure 18:
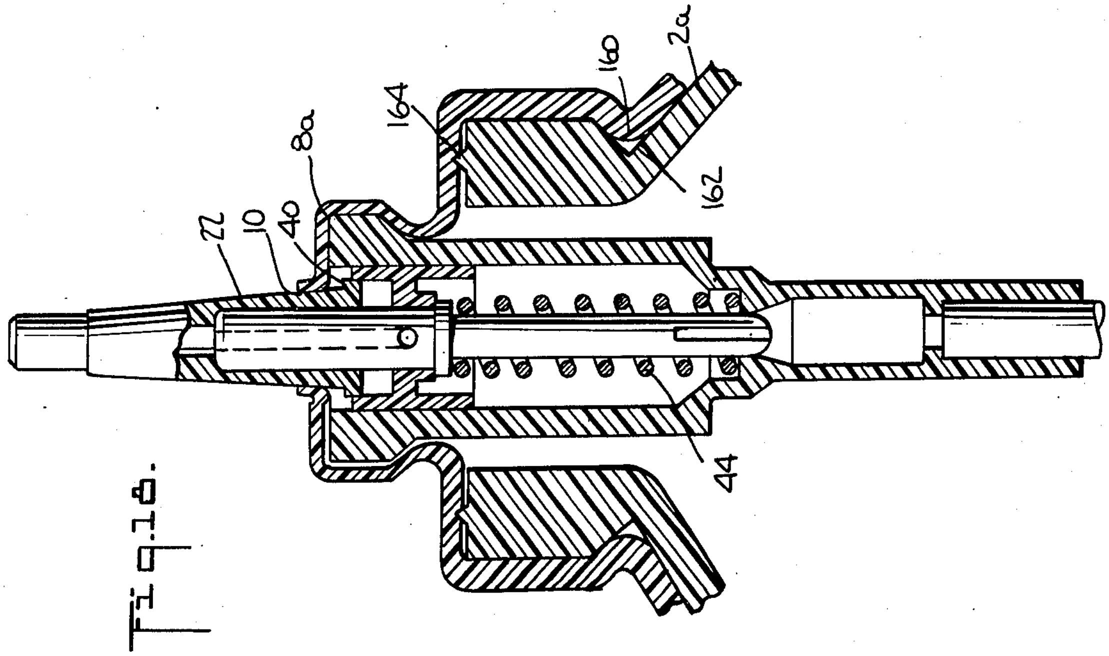
FIG. 18 is a cross-sectional side view of another embodiment utilizing a plastic mounting cup which snaps onto the container and omitting the sealing disc and showing the vent passage sealed by contact between cooperating surfaces of the mounting cup and stem.

FIGS. 18A, 18B and 18C show alternative constructions of that portion of stem 22 which wedgingly and sealingly contacts the central bore 10 to effect the up-position vent seal. FIG. 18A is a straight stem with a tapered lower end. FIG. 18B is beaded and FIG. 18C uses a tubber O-Ring.

FIG. 19 is similar to FIG. 18 in that the up-position seal is effected without a sealing disc. Here the side wall of stem 22 is straight and there is an air gap between stem 22 and the inner peripheral edge of central bore 10. However, the up-position seal is made by contact between the top of flange 40 and the underside of plastic mounting cup 8*a*.

Also in FIGS. 18 and 19 are alternative constructions for snapping mounting cup 8*a* onto a bottle or container. In FIG. 18 bead 160 wedgingly snaps into a V-shaped groove 162 in the neck of container 2*a* which may be plastic or glass. Rib 164 is a protrusion which bites into the overlying portion of plastic mounting cup 8A to seal the container. FIG. 19 shows an annular groove 168 in the laterally extending portion of mounting cup 8A which groove sealingly snaps over the outturned bead 170 of the container 2*a*. FIG. 19 also shows ears 172 as a convenient holding mechanism for supporting pump body 4 within the mounting cup. During assembly pump body 4 is snapped into position within ears 172. When the stem or plunger 22 is depressed breaking the contact between flange 40 and the underside of mounting cup 8A, air enters the container from the gap at central bore 10 and thence around the pump body 4 as aforesaid.

Figure 28:
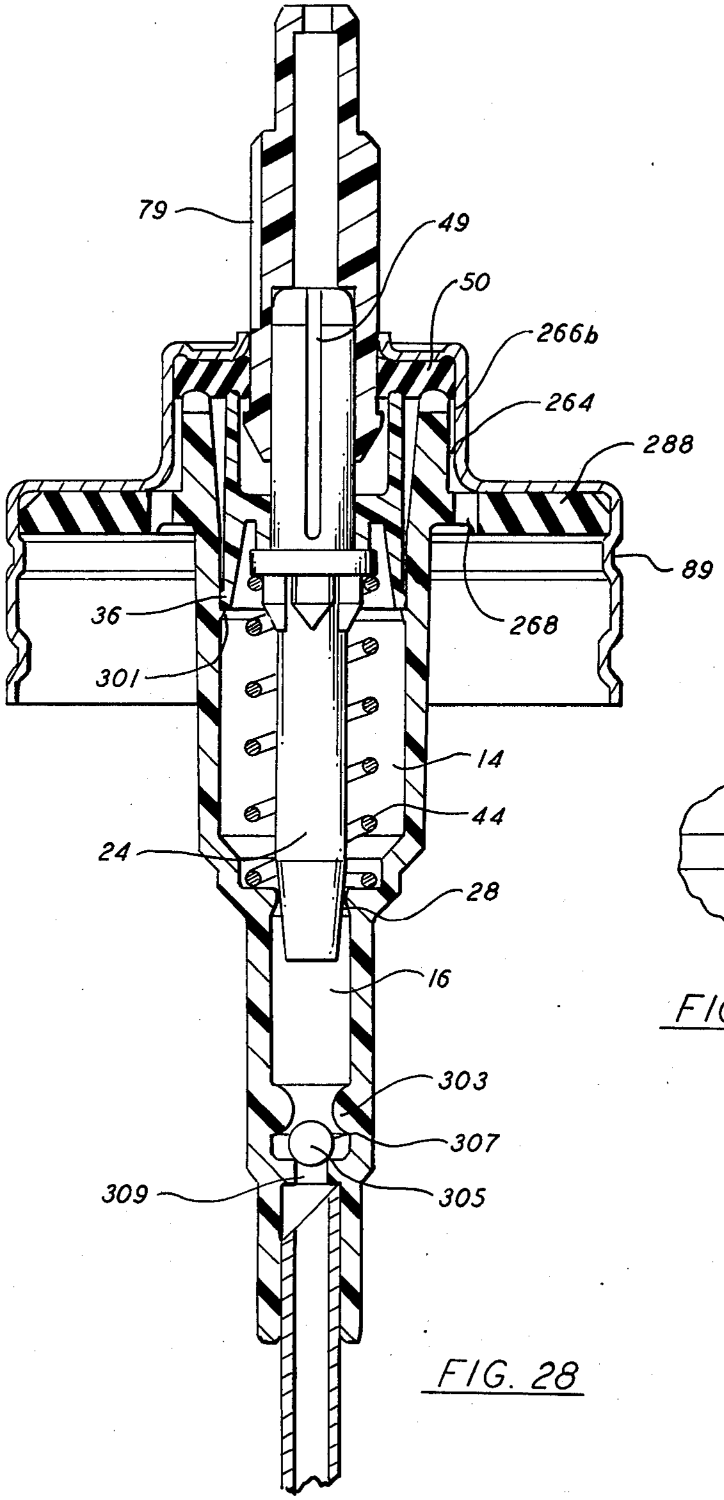
FIG. 28 is a cross-sectional view of another means of obtaining pre-pressurization utilizing a detent.
Figure 28A:
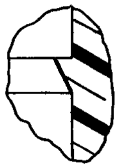
FIG. 28a is a detail of the detent of FIG. 28.

FIG. 28 is a view of another means of obtaining a detent so as to cause the operator to build up a finger pressure to better dispense the material. The construction of the pump is quite similar to that of FIG. 25. Thus, the pump body in this embodiment includes the flange 288 held in place in detents 89. The holes 268 for venting through the flange are formed in the manner described above as are channels 264 along the side and a channel 266*b* similar to the channels 266*a* described above. As noted, in this embodiment, because of the fact that the flange is retained in the mounting cup 4, it is unnecessary that the recess in the top of the pump body be formed for receiving the sealing disc 50. This pump is shown as having the slots 49 described in connection with FIG. 22 for dispensing the material. It is also shown as having the venting slot 79 also disclosed in connection with that embodiment. In this embodiment rather than having the detent at the valve formed at the opening 28, a detent in the form of a projection 301 is formed in the inner wall of the pump chamber 14. This is shown in more detail in FIG. 28*a*. The lower portion 36 of the piston rests against this detent when the plunger is pushed upward by the spring 44. Placing the detent 301 at this point rather than placng a detent at the throat 28 has a number of advantages. Primarily, the pump body is more flexible at that point than at the throat and will give a proper type of detent to prevent uneven discharge by the user without difficulty. Typically, the projecting annular flange 301 can have a dimension of only 0.002 inches. A detent of this nature is more pronounced where a minimum amount of actuating pressure is applied to the plunger, i.e., when the type of pressure is applied which would not result in proper discharge. The previous embodiments described generally use a fairly strong spring for returning the plunger since the seal between the lower plunger portion 24 and the opening 28 is a relatively tight seal. Using a heavy spring in conjunction with the detent 301 may not be desirable. However, using a lighter spring means that the seal at the bottom of the pump chamber 14 cannot be made as tight and may not be as good. Thus, at the bottom of the pump chamber 16 a constriction 303 is formed and a ball 305 snapped into the space 307 therebelow to form, with the opening 309 in the transverse wall of the chamber 16, a ball check valve. This will insure the development of adequate hydraulic pressure within the system even where a light spring and a minimum seal is made with the upper pump chamber.

I claim:

1. In a finger operated pump for dispensing material from a container, said pump including a pump chamber, a cylindrical piston member having at least one horizontal cross-sectional portion with a central opening therein, disposed in said chamber for movement therein, a stem for moving said piston member downward having a discharge channel therein comprising a first upper portion of first outer diameter larger than said opening and a second portion of an outer diameter slightly smaller than said opening inserted through said opening, a stop at the bottom of said second portion of a size larger than said opening abutting against said horizontal portion when said pump is unoperated; a first spring acting against said stop and biasing said piston upward; first valve means at the bottom of said chamber for establishing communication between said chamber and the material to be dispensed in the container, said first valve arragned to close on initial actuation of said stem, and second valve means for establishing communcation between said chamber and said discharge channel in said stem, said second valve means being formed by cooperating portions of said second stem portion and said horizontal portion, said second valve means operable to establish communication between said channel and said chamber only after a predetermined movement of said stem downward, a method of improving the evenness of dispensing comprising interposing a second spring between said first stem portion and the top of said horizontal portion whereby during the initial actuation when said first valve is closed and said second valve opened said spring will be compressed prior to opening of said second valve and store energy to create a prepressurization in the stem mechanism which will result in smooth dispensing even if the stem is not smoothly actuated.

2. In a finger operated pump for dispensing material from a container, said pump including a pump chamber, a cylindrical piston member having at least one horizontal cross-sectional portion with a central opening therein disposed in said chamber for movement therein, a stem for moving said piston member downward having a discharge channel therein comprising a first upper portion of first outer diameter larger than said opening and a second portion of an outer diameter slightly smaller than said opening inserted through said opening, a stop at the bottom of said second portion of a size larger than said opening abutting against said horizontal portion when said pump is unoperated; a first spring acting against said stop and biasing said piston upward; first valve means at the bottom of said chamber for establishing communication between said chamber and the material to be dispensed in the container, said first valve arranged to close on initial actuation of said stem, and second valve means for establishing communication between said chamber and said discharge channel in said stem, said second valve means being formed by cooperating portions of said second stem portion and said horizontal portion, said second valve means operable to establish communication between said channel and said chamber only after a predetermined movement of said stem downward, the improvement comprising a second spring interposed between said first stem portion and the top of said horizontal portion whereby, upon actuation of said stem by a user, said second spring will be compressed prior to the opening of said second valve means resulting in a prepressurization in the actuation of said pump so as to result in a more even discharge of material over a downward pumping stroke after said second valve means opens.

3. Apparatus according to claim 2 wherein said second valve means comprises an opening in said stem second portion in communication with said channel located above the bottom of said horizontal portion when said pump is not operated whereby initial movement of said stem downward will expose said opening, at the same time partially compressing said second spring, said second spring thereby storing energy to take up any unevenness in the actuation of said stem.

4. The apparatus according to claim 3 wherein said stem includes a third portion extending downward from said stop, said chamber has a central opening in its bottom, said third stem portion passes through said opening, said stem end including means cooperating with said opening to form said first valve means, the arrangement of said first valve means and the opening in said second stem portion being such that, upon depression: said first valve means closes after a first amount of motion; after additional motion, said second valve means opens, said second stem portion sliding within said piston, said second spring thereupon being compressed; and after further movement said stem operates said piston to dispense material.

5. Apparatus according to claim 4 wherein said channel is a central bore in said stem and said opening a port through the wall of said stem second portion.

6. Apparatus according to claim 4 wherein said means at the end of said third stem portion comprise a taper.

* * * * *

UNITED STATES PATENT AND TRADEMARK OFFICE

CERTIFICATE OF CORRECTION

PATENT NO. : 4,061,247

DATED : December 6, 1977

INVENTOR(S) : Philip Meshberg

It is certified that error appears in the above-identified patent and that said Letters Patent are hereby corrected as shown below:

Col. 6, line 24, correct spelling of "additional"

Col. 8, line 7, change "liquids" to --liquid--

Col. 8, line 66, change "36" to --16--

Col. 13, line 32, correct spelling of "central"

Col. 16, line 19, after "stem" insert --whose--

Col. 17, line 18, change "venting" to --Venting--

Col. 18, line 11, change "cop" to --cap--

Col. 20, line 6, correct spelling of "placing"

Col. 20, line 49, correct spelling of "arranged"

Col. 20, line 50 correct spelling of "communication"

Signed and Sealed this

*Twenty-second* Day of *August 1978*

[SEAL]

*Attest:*

DONALD W. BANNER

RUTH C. MASON
*Attesting Officer*

*Commissioner of Patents and Trademarks*